United States Patent [19]

Reed, Jr. et al.

[11] Patent Number: 5,042,385
[45] Date of Patent: Aug. 27, 1991

[54] INHIBITOR AND BARRIER FOR USE WITH HIGH ENERGY ROCKET PROPELLANTS

[75] Inventors: Russell Reed, Jr.; May L. Chan, both of Ridgecrest, Calif.

[73] Assignee: The United States of America as represented by the Secretary of the Navy, Washington, D.C.

[21] Appl. No.: 460,682

[22] Filed: Jan. 24, 1983

[51] Int. Cl.⁵ .............................................. F42B 1/00
[52] U.S. Cl. .................................................. 102/290
[58] Field of Search ............... 102/290; 60/253, 200.1

[56] References Cited

U.S. PATENT DOCUMENTS

| | | | |
|---|---|---|---|
| 3,108,433 | 10/1963 | De Fries et al. | 102/290 |
| 3,665,862 | 5/1972 | Lane | 102/103 |
| 3,765,177 | 10/1973 | Ritchey et al. | 102/290 |
| 3,965,676 | 6/1976 | Schaffling | 102/103 |
| 3,985,592 | 10/1976 | Hackett et al. | 102/290 |
| 4,009,231 | 2/1977 | Wasserman et al. | 102/290 |
| 4,042,441 | 8/1977 | Wasserman et al. | 102/103 |
| 4,187,215 | 2/1980 | Wrightson | 102/103 |
| 4,209,351 | 6/1980 | Pierce et al. | 102/103 |
| 4,232,608 | 11/1980 | Wrightson | 102/103 |
| 4,304,185 | 12/1981 | Sayles | 102/290 |
| 4,363,273 | 12/1982 | Luebber et al. | 102/290 |

Primary Examiner—Edward A. Miller
Attorney, Agent, or Firm—Melvin J. Sliwka; Sol Sheinbein

[57] ABSTRACT

A flame inhibitor coating for application to those surfaces of a solid propellant grain in a rocket motor where burning is not desired such as the aft end of a perforated propellant grain which includes a barrier layer of a mixture of amine silane, a trialkoxypropylsilylamino prepolymer, and diglycidylether of polypropylene glycol, an epoxy applied to the grain surface and allowed to cure to a polysiloxane layer, and a flame inhibitor layer applied over the barrier layer consisting of a mixture of hydroxyl terminated polybutadiene and dimeryl diisocyanate with flake aluminum which is applied over the barrier layer and allowed to cure. The barrier layer prevents migration of nitrate esters from the solid propellant grain to the flame inhibitor layer thus preventing peeling and reduction of flame inhibiting properties. The polysiloxane barrier layer is also useful in itself as a flame inhibitor and can also be employed between the insulator/liner of the rocket motor and the solid propellant grain.

18 Claims, 1 Drawing Sheet

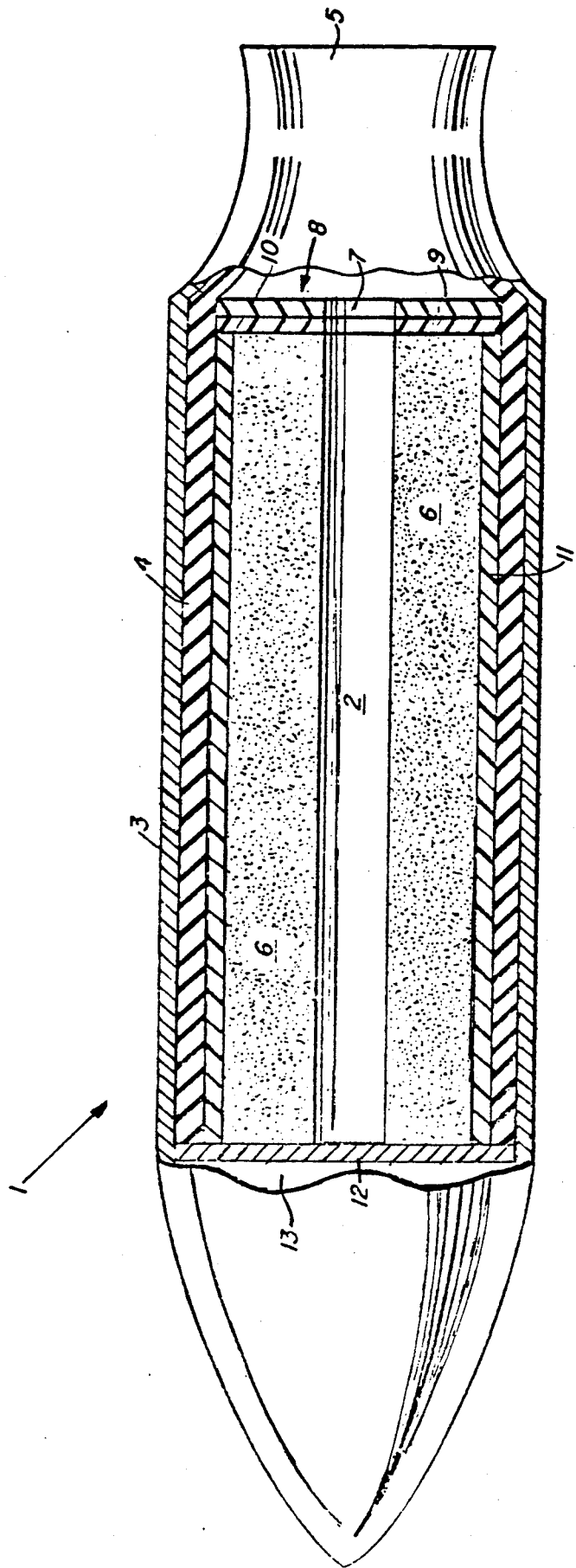

INHIBITOR AND BARRIER FOR USE WITH HIGH ENERGY ROCKET PROPELLANTS

BACKGROUND OF THE INVENTION

High energy solid propellants for use in rocket motors having ratios of nitro glycerin or other nitrate ester plasticizer to binder as high as 2.5 present significant storage problems in that the nitrate esters tend to migrate to the surface of the propellant. Such nitrate esters tend to be absorbed in flame inhibitor coatings and rocket casing liners and insulators, degrading their performance.

Flame inhibitor coatings are necessary in rocket motor applications to control the burning surface area of the grain, thus providing a steady supply of propulsive gas at constant pressure for as long as several minutes. Flame inhibitor coatings are applied to the grain surface of rubber based propellants where burning is not desired to accomplish this result. No prior inhibitors are known that are useful for propellants having nitrate ester plasticizers. Polymeric liner and inhibitor materials such as polyesters, polyethers, and polybutadienes with other compounds tend to absorb the nitrate esters migrating from high energy propellants, rendering the coating flammable and subject to peeling from the grain surface. Propellant grains having such a degraded coating are subject to uneven burning resulting in rocket malfunction.

Rocket casing liners and insulators also tend to absorb nitrate esters from the solid propellant resulting in softening of the liner. Liners and insulators are in part relied upon to inhibit burning of the propellant along the walls, and absorption of the nitrate esters renders them flammable resulting in possible rocket motor failure. Present practice includes the physical imbedment of nitrocellulose particles in the liner along the interior surface of the liner or insulator before casting of the propellant therein to inhibit nitrate ester migration, a process which is complex and must be carefully controlled.

The coating of a gun propellant with a siloxane polymer to function in part as a flame retardant to reduce peak pressure within a gun barrel when fired using the propellant is taught in U.S. Pat. No. 4,263,069 to Reed, Jr. et al. The use of this relatively non-flexible coating on a solid rocket propellant, however, would be undesirable. Rocket casings can be manufactured of filament wound reinforced polymeric materials which are subject to physical expansion under the high pressures of firing, resulting in dimensional changes in the solid propellant grain. Any flame retardant coating must, thus, be flexible so as to continue adhering to the grain surface without cracking, peeling, or breaking away during rocket motor firing. The siloxane coating of the prior art is not flexible, nor is it required to be so since a gun propellant is not subject to such dimensional changes as encountered in rocket propellants. Thus, the siloxane coatings of the prior art would not be useable for rocket propellant flame retardant coatings.

SUMMARY OF THE INVENTION

It is therefore an object of the invention to provide a flame retardant barrier useful to surface-inhibit solid propellant grains which is not subject to peeling from the grain surface.

It is a further object of the invention to provide a flame retardant barrier useful to surface-inhibit solid propellant grains which resists absorption of nitrate esters from the grain and rendering the barrier flammable.

These and other objects and attendant advantages of the invention will become apparent as the description proceeds.

In accordance with the invention a barrier layer is provided to prevent migration of nitrate esters from the propellant grain. The barrier layer is applied to the grain surface as a mixture of amine silane, a prepolymer in solution with methanol; a diglycidylether of polypropylene glycol, an epoxy; and nonyl phenol, a promoter, and allowed to cure. It is preferred in the practice of the invention that a metallized coating forming an insulating char barrier when exposed to flame be applied on the surface of the cured barrier layer to act as a flame inhibitor. The inhibitor layer is applied to the cured surface of the barrier layer as a mixture of hydroxyl terminated polybutadiene, dimeryl diisocyanate, ferric acetyl acetonate catalyst, and flake aluminum, and allowed to cure. As an alternative, the barrier layer mixture can be applied in a thick layer, with or without flake aluminum as a component, to the grain surface and the cured layer will act as both a barrier and a flame inhibitor. It is also contemplated, according to the present invention, that the barrier layer of the present invention be disposed between a propellant grain and the rocket casing liner and insulator to prevent migration of nitrate esters to those materials.

DESCRIPTION OF THE DRAWING

The sole FIGURE is a longitudinal section of an inhibited, internally-burning solid propellant grain according to the invention mounted in a rocket motor.

DESCRIPTION OF THE PREFERRED EMBODIMENT

Referring to the FIGURE, the rocket motor 1 thereshown has combustion chamber 2 contained by motor casing 3 made of reinforced composite material or metal. Motor casing 3 has an insulation/liner layer 4 made of a material such as a rubber. Although insulation/liner layer 4 is shown as a single layer, separate layers for the insulation and the liner can be provided. Motor casing 3 is terminated at the aft end by restricted nozzle 5. Solid propellant grain 6 is held within motor casing 3 by insulation/liner 4. Solid propellant grain 6 contains a central propellant void/perforation 7 extending axially therein. Upon rocket ignition, burning takes place upon the surface of the solid propellant grain 6 exposed to void/perforation 7. End coating 8 is applied to the exposed aft end surface of solid propellant grain 6 and prevents burning of the grain material at the aft end for a substantial portion of the rocket burn. This mode of burning provides for a more constant, controlled rate of burn than when burning takes place at the aft end of the grain, thus providing for more controlled rocket flight. In the case of rocket motors which have undergone accelerated aging, the burning surface may be effectively increased, thus, necessitating a reduction of the initial burning surface area. Reduction of the area can be best achieved by inhibiting the end of the grain. Further, in certain test motor designs a more constant pressure can be realized by inhibiting the ends of the grain. End coating 8, according to the present invention, is made up of end barrier layer 9 and end flame inhibitor layer 10 as described in more detail below.

Also, as shown in rocket motor 1, liner barrier layer 11 is located between insulation/liner 4 and solid propellant grain 6 acting as a barrier and flame inhibitor along the outer longitudinal surface of solid propellant grain 6. Also shown in the FIGURE is delivery payload 13 attached to rocket motor 1 at bulkhead 12.

The barrier layer 9 of the invention contains amine silane a prepolymer containing trimethoxypropylsilyl groups attached to a polyamide backbone. This amine silane prepolymer has a molecular weight of about 2000 and contains about from 2-3 trimethoxypropylsilyl groups attached to the backbone. The polyamide backbone is formed by the following reaction:

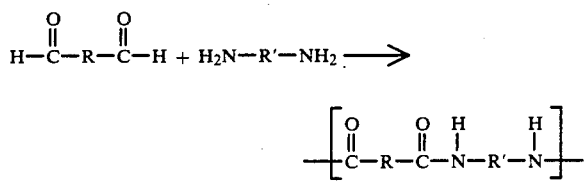

wherein R and R' are alkyl substituents selected from the group consisting of methyl, ethyl and propyl. The $H_2NR'NH_2$ compound is present in excess so that the polyamide formed is "amine" terminated. One of the most important characteristics of the polyamide backbone is that it has terminal amine groups. The nature of the backbone provides for the necessary flexibility of the layer for application to solid rocket grains which tend to change dimensions during firing. The amine silane prepolymer itself is a product of the reaction of the above described amine terminated polyamide prepolymer and γ-chloropropyltrimethoxysilane. Usually two or three trimethoxypropylsilyl or "silane" groups, having the structure $-CH_2CH_2CH_2Si(OCH_3)_3$ link onto the nitrogen in the polyamide structure to form the following:

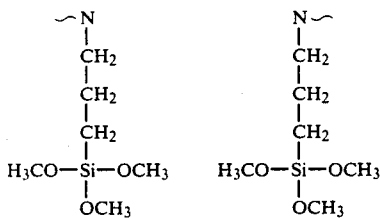

Upon application to the grain surface it is believed that a siloxane polymer forms. It is theorized that the silane reacts with traces of water in the grain according to the equation

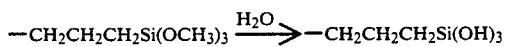

and that the triol formed is unstable and quickly loses water to form a polysiloxane at the grain surface with Si—O— bonds directly with the grain material, itself.

Union Carbide Y5987 is the preferred amine silane prepolymer, obtainable from Union Carbide, Inc. New York, N.Y. This material contains the necessary silane functionability which can cross-link the polymer or bond it to a substrate.

At at least the terminal points of the polyamide backbone a trimethoxypropylsilyl group is attached to a terminal NH-group. The diglycidyl ether of polypropylene glycol (epoxy) both polymerizes and reacts with the terminal NH group in the presence of a promoter, nonyl phenol, thus forming a polymerized epoxy layer chemically bonded to the polysiloxane layer. The diglycidyl ether of polypropylene glycol is a preferred epoxy due to its flexibility. The diglycidyl ether of polypropylene glycol preferred is that designated DOW DER 732 by Dow Chemical Co., Midland, Mich., but DOW DER 736 which exhibits a lower molecular weight could be used.

The preferred ratio of amine silane and epoxy prepolymers employed is about stoichiometric amounts however ratios up to 20 percent out of stoichiometric are tolerable. The amount of nonyl phenol promoter can vary depending on cure time desired and size of mix, but a ratio of about 0.027:1 by weight promoter to the amine silane used is preferred. The amine silane employed is normally supplied in methanol solution.

The barrier layer material is mixed at room temperature and painted on the grain surface where desired. The material is allowed to cure at room temperature for about 24 hours to form the barrier coating.

A flame inhibitor layer 10 for application over the cured barrier layer 9 is composed of approximately stoichiometric amounts of hydroxyl terminated polybutadiene and dimeryl diisocyanate, although other than stoichiometric amounts may be employed yielding a softer product. It is preferred that flake aluminum, commercially available, be incorporated in the inhibitor layer mix which makes the mix thicker for ease of application and aids in reflecting heat during firing. The amount of flake aluminum employed in the mix may vary, but a ratio of about 1:6 aluminum flake to polybutadiene by weight is preferred. A catalyst in a desired amount is employed in the inhibitor layer mix, the preferred catalyst being ferric acetyl acetonate in a ratio of about 1:100 by weight catalyst to polybutadiene. The amount of catalyst can be varied depending on batch size and pot life desired.

The flame inhibitor layer 10 is applied over the cured barrier layer 9 by painting in a desired thickness and allowed to cure at room temperature for about 48 hours.

In an alternative embodiment the barrier layer material can be used alone, acting, also, as an inhibitor layer. In this case the barrier layer is applied to form a thicker layer than when applied for use in conjunction with the polybutadiene inhibitor layer. It is, also, preferred that the metal flake be incorporated in the barrier layer mix when employed alone to increase heat reflection capabilities, thus enhancing its performance as a flame inhibitor. The ratio of metal flake used in the layer is preferably about 1:6 metal to amine silane, by weight.

The amine siloxane/epoxy material can also be employed as liner barrier/flame inhibitor layer 11 disposed between the grain surface and the rocket casing insulator or cast cure liner when used. The mixture is applied upon the interior surface of the casing insulator or liner and allowed to cure. The propellant grain is then cast within the lined casing.

The following examples illustrate the practice of the present invention.

EXAMPLE 1

A barrier mixture was prepared by mixing 5 grams Union Carbide Y5987 amine silane, 2.5 grams diglycidylether of polypropylene glycol, and 0.136 grams nonylphenol. The amine silane was in solution with 5 grams methanol. The mix was brushed upon the ignition end of a cylindrically shaped 25 lb charge propellant grain at room temperature and allowed to cure overnight. The axially located annular void or perforation of the grain was uncoated.

A flame inhibitor mixture was prepared by mixing 36.0 grams hydroxyl terminated polybutadiene, 9.9 grams dimeryl diisocyanate, 6.0 grams aluminum flake, and 0.05 grams ferric acetyl acetonate. The mix was brushed over the cured inhibitor layer described above and allowed to cure at ambient room temperature for 48 hours.

EXAMPLE 2

Test specimens were prepared by coating representative propellant grains according to the procedure in Example 1. Peel tests were conducted to determine adherence of the polysiloxane/epoxy coating to the grain. Tests carried out at 30 percent relative humidity and 120° F. averaged 3.79 pounds per lineal inch. Tests carried out at 50 percent relative humidity and 120° F. averaged 4.16 pounds per linear inch. Substantially all failures occurred leaving a complete layer of propellant on the separated coating, illustrating the strong adherence of the polysiloxane/epoxy barrier coating to the propellant grain.

EXAMPLE 3

A test specimen was prepared by coating a rocket propellant sample with a barrier layer according to the procedure in Example 1. The propellant of the sample is known as VTG-5A, a polyurethane polymer based propellant having a high level of nitroglycerin plasticizer typical of modern high energy propellants. The coated sample was aged for one month at ambient temperature after which the barrier layer was peeled from the propellant sample. Visual inspection indicated that no nitroglycerin had passed through the barrier layer sample during aging. An ATR (attenuated total reflection) technique used on an FTIR (Fourier Transform Infrared Spectrascope) analysis of the barrier layer sample indicated a nitroglycerin absorption level of one percent or less by weight.

EXAMPLE 4

A number of perforated high energy rocket propellant grains subject to deformation during firing were static fired employing the flexible barrier layer and flame retardant layer of the present invention. The layers were applied according to the preferred embodiment of the invention as discussed above to the aft surface of the respective propellant grains. Analysis of the data collected during the firings, such as pressure vs. time, confirmed that the barrier and flame retardant layers of the present invention were effective in retarding burning at the aft surface of the propellant grain for the time period necessary to allow successful propellant burn.

The above examples further demonstrate the effectiveness and practicality of the barrier layer and flame retardant layer combination of the present invention by demonstrating physical adherence and resistance to nitrate ester absorption of the barrier layer, and the effectiveness of the combination of barrier layer and flame retardant layer in actual propellant firings.

It is to be realized that only preferred embodiments of the invention have been described and that numerous substitutions, alterations, and modifications are all permissible without departing from the spirit and scope of the invention as defined in the following claims.

We claim:

1. A flexible flame inhibitor and barrier system for high energy solid rocket propellant grains having ratios of nitroglycerin or other nitrate ester plasticizers to binder as high as 2.5, said system comprising a coating adherent to that portion of the surface of said grain where burning is to be inhibited, said coating having a first cured layer resulting from the curing of a first mixture having an amine silane prepolymer and a diglycidylether of polypropylene glycol curative.

2. The flame inhibitor and barrier system of claim 1 wherein said amine silane prepolymer is a trialkoxypropylsilyl amino prepolymer having a molecular weight of about 2000, comprised of trimethoxypropylsilyl groups chemically bonded to amine terminated polyamide backbone.

3. The flame inhibitor and barrier system of claim 1 wherein said first mixture contains about stoichiometric proportions of amine silane prepolymer and diglycidylether of polypropylene glycol curative.

4. The flame inhibitor and barrier system of claim 1 wherein said first mixture further comprises a promoting amount of nonyl phenol.

5. The flame inhibitor and barrier system of claim 1 wherein said coating adherent to that portion of the surface of said grain where burning is to be inhibited, further comprises a second cured layer adjacent said first cured layer, said second cured layer, resulting from the curing of a second mixture having a hydroxyl terminated polybutadiene prepolymer and a dimeryl diisocyanate.

6. The flame inhibitor and barrier system of claim 5 wherein said second mixture further comprises a quantity of flake aluminum.

7. The flame inhibitor and barrier system of claim 6 wherein said second mixture contains about stoichiometric proportions of a hydroxyl terminated polybutadiene and a dimeryl diisocyanate.

8. The flame inhibitor and barrier system of claim 5 wherein said second mixture further comprises a catalytic amount of ferric acetyl acetonate.

9. The flame inhibitor and barrier system of claim 1 wherein said grain is of an annular elongated configuration defining an axially located elongated void opening into an aft end, said grain having an aft surface and wherein said first cured layer covers said aft surface.

10. The flame inhibitor and barrier system of claim 6 wherein said grain is of an annular elongated configuration defining an axially located elongated void opening into an aft end, said grain having an aft surface and wherein said second cured layer covers said aft surface.

11. The flame inhibitor and barrier system of claim 6 wherein the ratio of aluminum flake to the hydroxyl terminated polybutadiene of said second mixture is about 1 to 6 by weight.

12. A flame inhibitor and barrier coating for high energy solid rocket propellant grains having ratios of nitroglycerin or other nitrate ester plasticizers to binder as high as 2.5, said coating comprising a cured coating adherent to that portion of the surface of said grain where burning is to be inhibited, said coating having an amine silane prepolymer and a diglycidylether of polypropylene glycol curative.

13. The cured coating of claim 12 wherein said amine silane prepolymer is a trialkoxypropylsilyl amino prepolymer, having a molecular weight of about 2000, comprised of trimethoxypropylsilyl groups chemically bonded to a polyamide backbone.

14. The cured coating of claim 12 wherein said coating contains about stoichiometric proportions of amine silane prepolymer and diglycidylether of polypropylene glycol curative.

15. The cured coating of claim 12 wherein said coating further comprises a promoting amount of nonyl phenol.

16. The cured coating of claim 12 wherein said coating further comprises a quantity of flake aluminum.

17. The cured coating of claim 12 wherein said grain is of an annular elongated configuration defining an axially located elongated void opening into an aft end, said grain having an aft surface wherein said cured coating covers said aft surface.

18. The cured coating of claim 12 wherein said rocket propellant grain is located within a rocket motor casing having an exterior wall, said grain being separated from said wall by a liner and wherein said coating covers that portion of the surface of said grain located adjacent said liner so as to form a flame inhibiting barrier.

* * * * *